United States Patent
Numata et al.

(10) Patent No.: US 9,989,776 B2
(45) Date of Patent: Jun. 5, 2018

(54) DISPLAY DEVICE

(71) Applicant: Japan Display Inc., Tokyo (JP)

(72) Inventors: Yudai Numata, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days. days.

(21) Appl. No.: 15/471,598

(22) Filed: Mar. 28, 2017

(65) Prior Publication Data

US 2017/0285359 A1 Oct. 5, 2017

(30) Foreign Application Priority Data

Mar. 31, 2016 (JP) .................................. 2016-071749

(51) Int. Cl.
G02B 27/22 (2018.01)
G02B 5/124 (2006.01)
G02B 27/26 (2006.01)
G02B 5/30 (2006.01)

(52) U.S. Cl.
CPC ......... G02B 27/2292 (2013.01); G02B 5/124 (2013.01); G02B 5/3058 (2013.01); G02B 5/3083 (2013.01); G02B 27/26 (2013.01)

(58) Field of Classification Search
CPC .. G02B 27/2292; G02B 5/124; G02B 5/3058; G02B 5/3083; G02B 27/26; G02F 2001/133638
USPC ....................... 359/485.01, 489.07, 530, 614
See application file for complete search history.

(56) References Cited

U.S. PATENT DOCUMENTS

| | | | |
|---|---|---|---|
| 3,709,580 A * | 1/1973 | Fugitt | G02B 23/22 359/488.01 |
| 3,980,393 A * | 9/1976 | Heasley et al. | G02B 5/12 359/534 |
| 4,107,522 A * | 8/1978 | Walter | G01V 8/18 250/221 |
| 5,061,050 A * | 10/1991 | Ogura | G02B 5/3033 359/487.04 |
| 5,422,756 A * | 6/1995 | Weber | G02B 5/124 359/485.03 |
| 5,559,634 A * | 9/1996 | Weber | G02B 5/124 359/485.04 |

(Continued)

FOREIGN PATENT DOCUMENTS

JP 2011-253128 A 12/2011

OTHER PUBLICATIONS

Machine language translation of JP Publication No. 2011-253128 (published Dec. 15, 2011) from https://www4.j-platpat.inpit.go.jp/cgi-bin/tran_web_cgi_ejje?u=http://www4.j-platpat.inpit.go.jp/eng/translation/201802010559469231734316561454691 9CEC0E14FEC22421C5A34C99E6D7FC18E. Downloaded Jan. 31, 2018.*

*Primary Examiner* — Frank Font
(74) *Attorney, Agent, or Firm* — Michael Best & Friedrich LLP

(57) ABSTRACT

According to one embodiment, a display device includes a display module which emits display light, a polarizing element including a transmission axis which transmits first linearly polarized light, the polarizing element reflecting second linearly polarized light intersecting the transmission axis, and an optical element includes a retroreflector which retroreflects light reflected from the polarizing element, the optical element being curved, and includes a first portion which is concave, and a second portion which is convex and is connected to the first portion.

19 Claims, 15 Drawing Sheets

(56) References Cited

U.S. PATENT DOCUMENTS

| | | | | |
|---|---|---|---|---|
| 5,726,806 A | * | 3/1998 | Holden | G02B 27/01 |
| | | | | 359/630 |
| 5,764,411 A | * | 6/1998 | Shanks | G02B 27/2292 |
| | | | | 359/485.02 |
| 5,861,993 A | * | 1/1999 | Shanks | G02B 5/124 |
| | | | | 359/629 |
| 2010/0214394 A1 | * | 8/2010 | Maekawa | G02B 5/136 |
| | | | | 348/51 |
| 2015/0248014 A1 | * | 9/2015 | Powell | G02B 3/0006 |
| | | | | 349/10 |
| 2017/0285359 A1 | * | 10/2017 | Numata | G02B 5/124 |

* cited by examiner

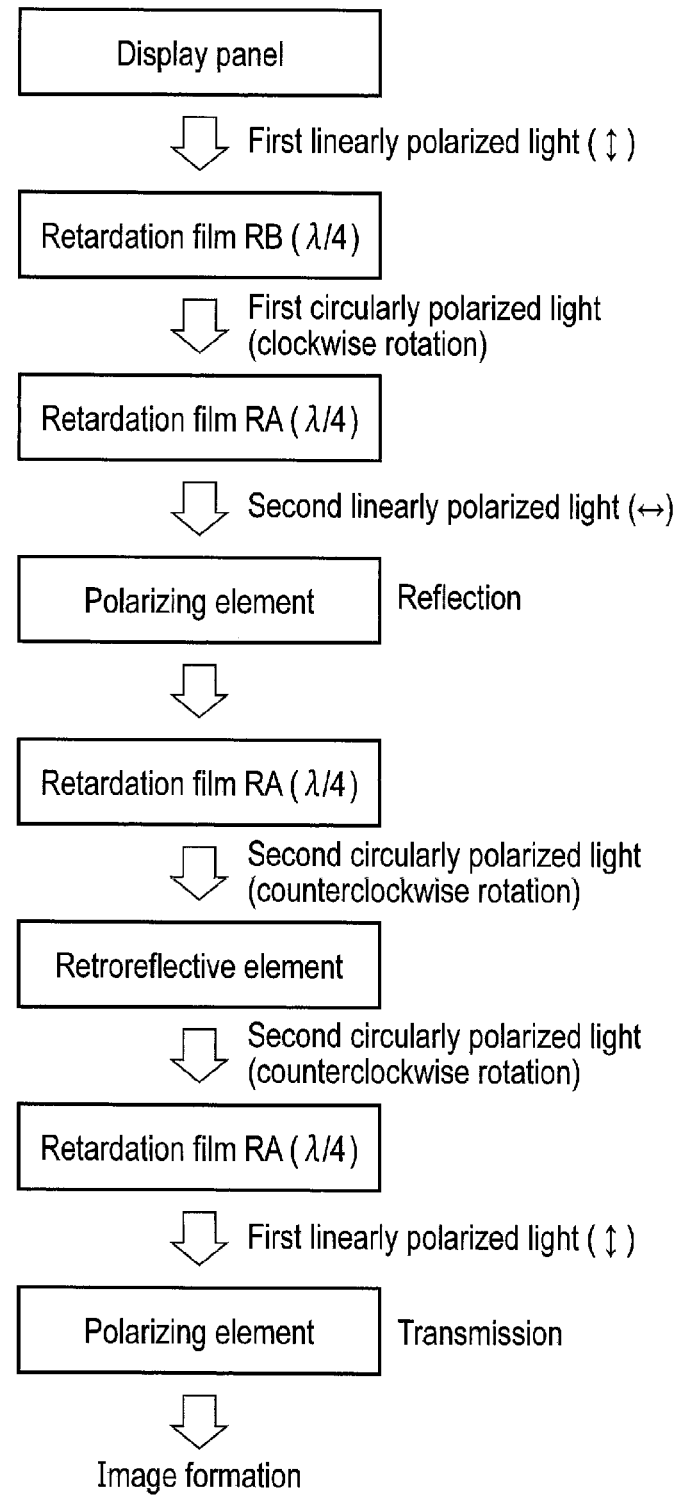
F I G. 2

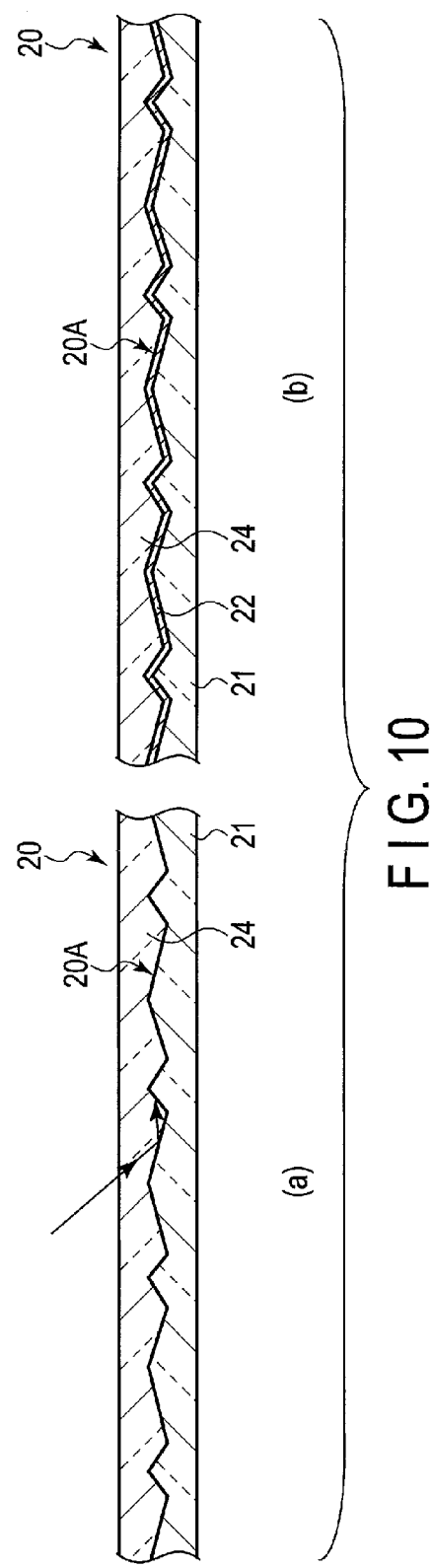
F I G. 10

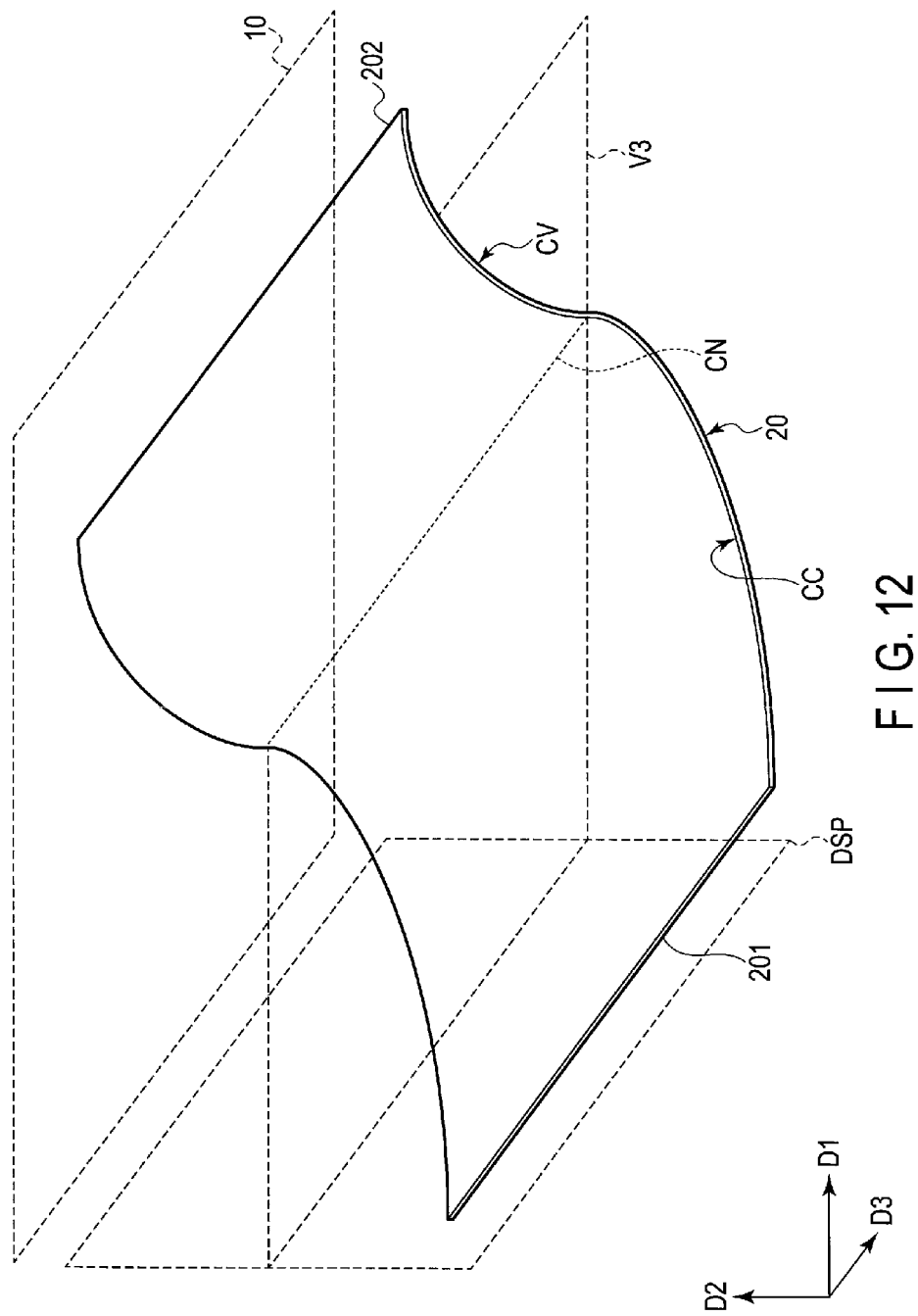
F I G. 12

DISPLAY DEVICE

CROSS-REFERENCE TO RELATED APPLICATIONS

This application is based upon and claims the benefit of priority from Japanese Patent Application No. 2016-071749, filed Mar. 31, 2016, the entire contents of which are incorporated herein by reference.

FIELD

Embodiments described herein relate generally to a display device.

BACKGROUND

An image-forming device comprising, for example, a polarizing filter, a retroreflection prism, and a retardation film has been proposed. With this image-forming device, a real image representing a display image is formed at a position that is in plane symmetry to an emission point of display light representing the display image with respect to the polarizing filter. Incidentally, the retroreflective prism includes a flat front surface and an uneven back surface. Of light emitted from a display, reflected by a half mirror, and made incident on the retroreflective prism, the light which has reached the back surface is retroreflected, but the light reflected from the front surface forms an image at a position different from where the retroreflected light forms an image. Further, the light reflected from a surface of the retardation film similarly forms an image at a position different from the retroreflected light. Accordingly, separately from the actual image formed by the retroreflected light, the so-called ghost is visually recognized which may cause deterioration in display quality. In addition, since light which is emitted from the display and is reflected on the surface of the retroreflective prism directly without being transmitted to the half mirror also does not contribute to display of the real image, the display quality may be deteriorated.

BRIEF DESCRIPTION OF THE DRAWINGS

FIG. 2 is an illustration for describing the functions of structures which constitute the display device 1.

FIG. 10 is a cross-sectional view showing configuration examples of the optical element 20 applicable in the present embodiment.

FIG. 12 is a perspective view for explaining the relative positional relationship between the optical element 20, the display module DSP, and the polarizing element 10.

DETAILED DESCRIPTION

Figure 1:
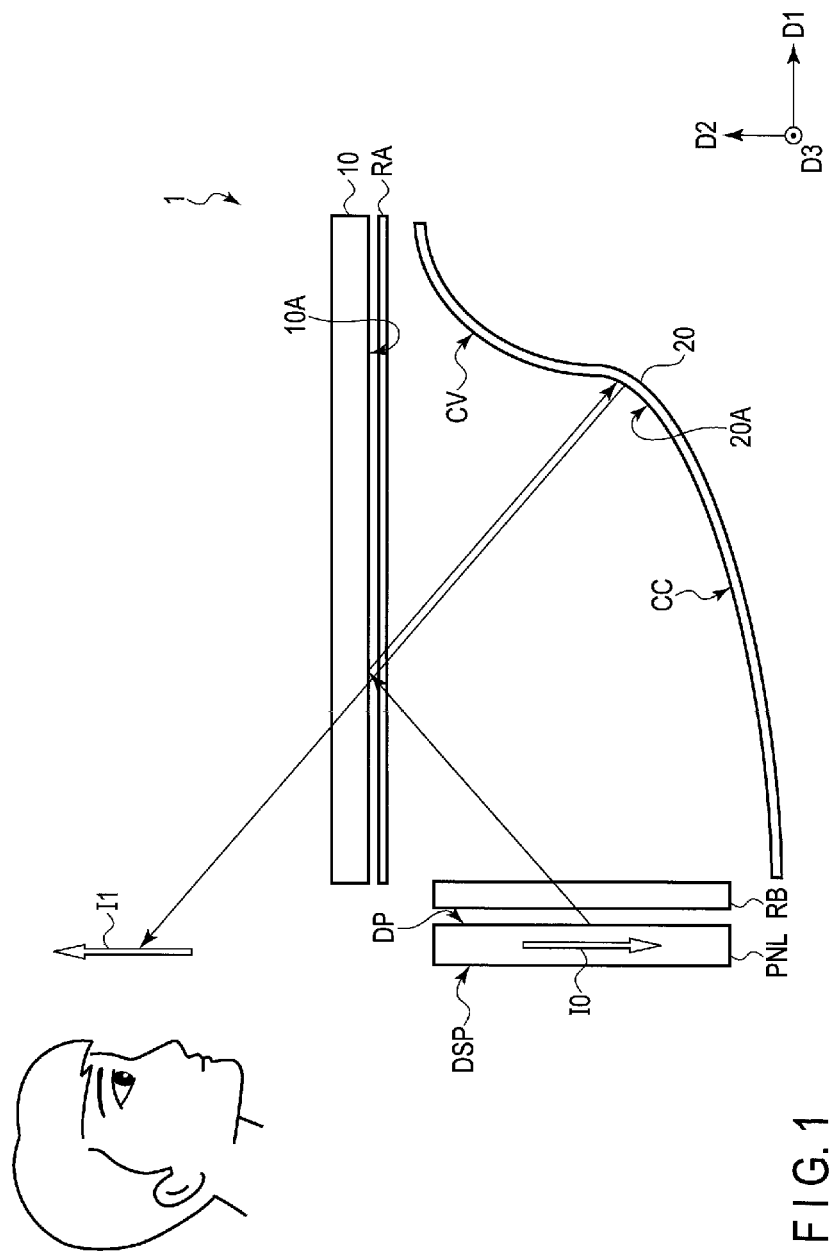
FIG. 1 is an illustration showing a configuration example of a display device 1 of the present embodiment.

In general, according to one embodiment, a display device includes: a display module which emits display light; a polarizing element including a transmission axis which transmits first linearly polarized light, the polarizing element reflecting second linearly polarized light intersecting the transmission axis; and an optical element comprising a retroreflector which retroreflects light reflected from the polarizing element, the optical element being curved, and comprising a first portion which is concave, and a second portion which is convex and is connected to the first portion.

According to another embodiment, a display device includes: a display module which emits display light; a polarizing element including a transmission axis which transmits first linearly polarized light, the polarizing element reflecting second linearly polarized light intersecting the transmission axis; and an optical element comprising a retroreflector which retroreflects light reflected from the polarizing element, the optical element comprising a first portion and a second portion, the first portion being a concave surface recessed toward a side separated from the polarizing element, the second portion being a convex surface projected toward a side closer to the polarizing element, the first portion being closer to the display module than the second portion is.

According to yet another embodiment, a display device includes: a display module which emits display light; a polarizing element including a transmission axis which transmits first linearly polarized light, the polarizing element reflecting second linearly polarized light intersecting the transmission axis; and an optical element comprising a retroreflector which retroreflects light reflected from the polarizing element, the optical element including a first end portion, a second end portion, a first portion, a second portion, and a connection part connecting the first portion and the second portion, the first portion being located between the first end portion and the connection part, and having a concave shape recessed toward a side that is more separated from the display module and the polarizing element than a surface connecting the first end portion and the connection part, the second portion being located between the connection part and the second end portion, and having a convex shape projected toward a side that is closer to the display module and the polarizing element than a surface connecting the connection part and the second end portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements, which have functions identical or similar to the functions described in connection with preceding drawings, are denoted by the same reference numbers, and an overlapping detailed description thereof may be arbitrarily omitted.

FIG. 1 is an illustration showing a configuration example of a display device 1 of the present embodiment. In the drawing, while a first direction D1, a second direction D2, and a third direction D3 are orthogonal to each other, they may intersect at an angle other than 90 degrees.

The display device 1 comprises a display module DSP, a polarizing element 10, a retardation film RA, an optical element 20, and the like.

The structure of the display module DSP is not particularly limited as long as the display module DSP can emit display light. In one example, the display module DSP is configured to emit the display light which is circularly polarized light, and includes a display panel PNL and a retardation film RB. In one example, the display panel PNL is a liquid crystal display panel which holds a liquid crystal layer between a pair of substrates. However, the display panel PNL may be a self-luminous display panel including an organic electroluminescent element and the like, an electronic paper display panel including a cataphoretic element and the like, a display panel employing micro-electromechanical systems (MEMS), or a display panel employing electrochromism. The liquid crystal display panel may be a transmissive display panel which displays an image by selectively transmitting light from a light source device, a reflective display panel which displays an image by selectively reflecting external light or the light from the light source device, or a transflective display panel having display functions of both the transmissive type and the reflective type. In the example illustrated, a display surface DP of the display panel PNL is parallel to a plane defined by the second direction D2 and the third direction D3.

The display panel PNL emits display light representing a display image I0. The display light is, for example, linearly polarized light. The retardation film RB is opposed substantially parallel to the display surface DP of the display panel PNL. The retardation film RB may be bonded to the display surface DP of the display panel PNL. The retardation film RB is, for example, a λ/4 plate which imparts a phase difference of approximately λ/4 to the transmitted light. λ indicates a wavelength of the transmitted light. Though the specifics will not be described here, the retardation film RB is disposed such that its slow axis intersects a polarization plane of the linearly polarized light at an angle of 45°. In the display module DSP, the display light (linearly polarized light) emitted from the display panel PNL is transmitted through the retardation film RB and is thereby converted into circularly polarized light. The circularly polarized light in the present embodiment includes elliptically polarized light.

If the light emitted from the display panel PNL is circularly polarized light, the retardation film RB is not disposed in the display module DSP. In addition, the display module DSP may include a screen onto which light emitted from a projector is projected or a display medium (a poster or the like) illuminated by an illumination device, instead of the display panel. Also, the display module DSP may be configured to emit display light which is linearly polarized light, and if the light emitted from the display panel PNL is linearly polarized light, the retardation film RB is omitted.

The polarizing element 10 comprises a transmission axis which transmits first linearly polarized light, and reflects second linearly polarized light orthogonal to the transmission axis. For example, the first linearly polarized light is a P wave parallel to the plane of incidence, and the second linearly polarized light is an S wave perpendicular to the plane of incidence. The polarizing element 10 is composed of, for example, a wire-grid polarizing filter, a reflective polarizing film using a brightness enhancement film, or a multi-layered body in which the reflective polarizing film and an absorption-type polarizer are overlapped. The absorption-type polarizer is a polarizer which transmits linearly polarized light parallel to the transmission axis, and absorbs linearly polarized light orthogonal to the transmission axis. If the polarizing element 10 is composed of the multi-layered body, the absorption-type polarizer is disposed on the reflective polarizing film (i.e., on an opposite side of a side that is opposed to the retardation film RA), and has a transmission axis parallel to that of the reflective polarizing film.

The polarizing element 10 includes an inner surface 10A that is opposed to the optical element 20. In the example illustrated, the inner surface 10A is parallel to a plane defined by the first direction D1 and the third direction D3, and is orthogonal to the display surface DP.

The retardation film RA is located between the polarizing element 10 and the optical element 20, is arranged along the inner surface 10A of the polarizing element 10, and extends substantially parallel to the inner surface 10A. The retardation film RA may be bonded to the inner surface 10A of the polarizing element 10. The retardation film RA as described above is, for example, a λ/4 plate which imparts a phase difference of approximately λ/4 to the transmitted light. Though the specifics will not be described here, the retardation film RA is disposed such that its slow axis intersects a polarization plane of the linearly polarized light at an angle of 45°. Note that each of the retardation films RA and RB may be a stacked layer body of retardation films having different phase difference values and wavelength dispersion properties. For example, the retardation films RA and RB may be structured by combining a λ/2 plate and a λ/4 plate in order to reduce wavelength dependency.

The optical element 20 is opposed to the display module DSP and the retardation film RA. The optical element 20 of the present embodiment is a retroreflective element comprising a retroreflector which retroreflects the incident light. Though details of the retroreflector will be described later, the optical element 20 includes a retroreflective surface 20A constituted of a plurality of retroreflectors. The optical element 20 is curved, and includes a first portion CC and a second portion CV along the first direction D1. The first portion CC is formed to be concave, and the second portion CV is formed to be convex. In the optical element 20, focusing on the positional relationship between the two portions in the first direction D1, the first portion CC is closer to the display module DSP than the second portion CV is. Also, in the optical element 20, focusing on the positional relationship between the two portions in the second direction D2, the first portion CC is located to be more separated from the polarizing element 10 and the retardation film RA than the second portion CV. As illustrated in the drawing, with respect to a cross-section defined by the first direction D1 and the second direction D2, the optical element 20 has a substantially S-shaped cross-section. The definition of concave and convex in the present embodiment will be given later.

In the figure, I1 corresponds to an aerial image of the display image I0 displayed on the display module DSP, and is formed at a position that is in plane symmetry to the display image I0 with respect to the polarizing element 10. The light forming the aerial image I1 is the linearly polarized light transmitted through the polarizing element 10 after being retroreflected by the optical element 20.

Next, referring to FIGS. 1 and 2, the functions of structures for forming the display image TO displayed on the display module DSP as the aerial image I1 will be described.

First, in the display module DSP, the display panel PNL emits the first linearly polarized light corresponding to the display light of the display image I0. The first linearly polarized light has a polarization plane parallel to the transmission axis of the polarizing element 10, and corresponds to the linearly polarized light which transmits through the polarizing element 10. The first linearly polarized light is transmitted through the retardation film RB, and is converted into first circularly polarized light. The first circularly polarized light draws a locus which rotates clockwise as seen from the side opposite to the direction of travel of the light. The display module DSP thereby emits the display light which is the first circularly polarized light.

Next, the display light which is the first circularly polarized light transmits through the retardation film RA, and is converted into the second linearly polarized light. The second linearly polarized light has a polarization plane perpendicular to the transmission axis of the polarizing element 10. The second linearly polarized light is reflected by the polarizing element 10, and then transmits through the retardation film RA again and is converted into second circularly polarized light. The second circularly polarized light draws a locus which rotates counterclockwise as seen from the side opposite to the direction of travel of the light. In other words, the second circularly polarized light is the circularly polarized light in which the rotation is reverse to the first circularly polarized light.

Next, the second circularly polarized light is made incident on the optical element 20. The incident light of the optical element 20 is retroreflected by the retroreflective surface 20A. At this time, the retroreflected light is the second circularly polarized light. Further, the second circularly polarized light transmits through the retardation film RA again, and is converted into the first linearly polarized light. The first linearly polarized light transmits through the polarizing element 10, and an image is formed as the aerial image I1 representing the display image I0. The observer can observe the aerial image I1 floating in air from the side opposed to the direction of travel of the first linearly polarized light which has transmitted through the polarizing element 10.

Next, a specific example of each of the structures will be described.

Figure 3:
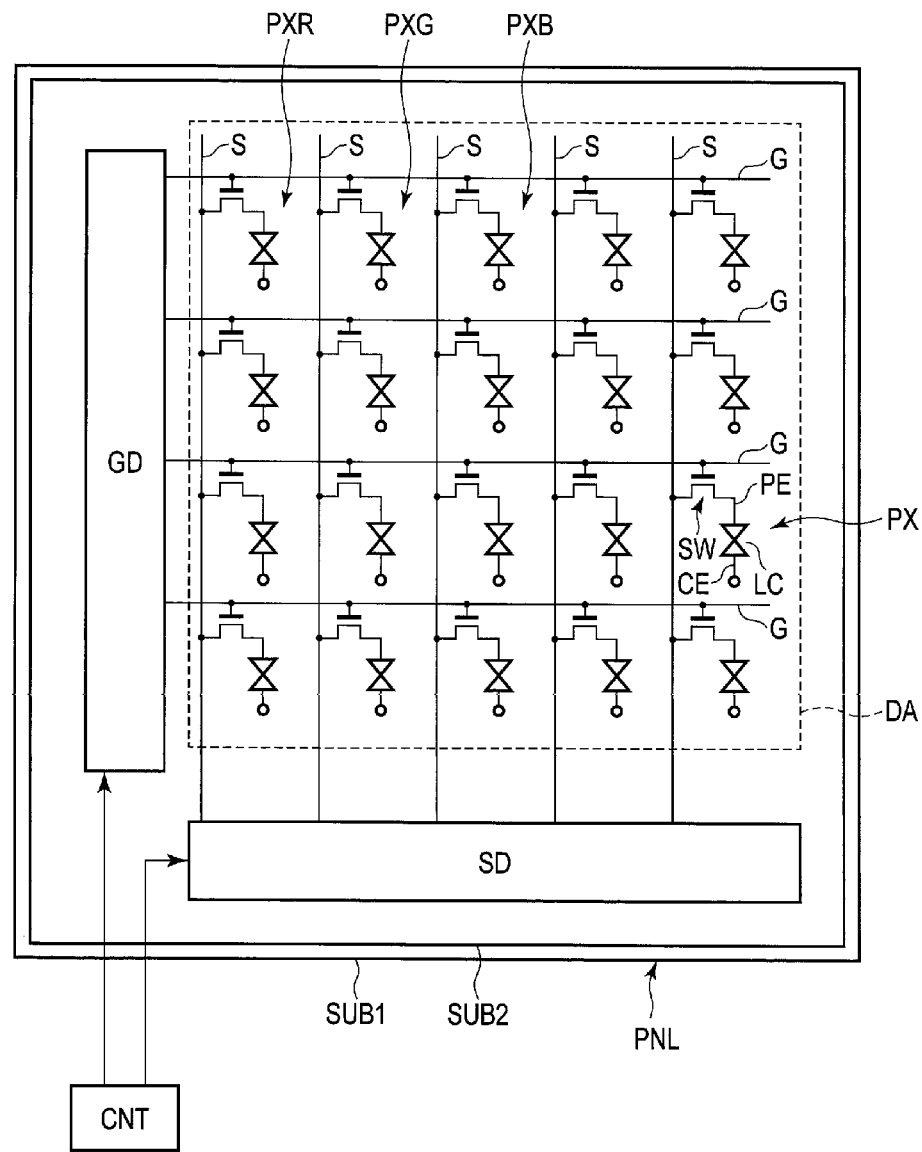
FIG. 3 is an illustration showing a configuration example of a display panel PNL shown in FIG. 1.

FIG. 3 is an illustration showing a configuration example of the display panel PNL shown in FIG. 1. An active-matrix-driving transmissive liquid crystal display panel will be described as an example of the display panel PNL. More specifically, the display panel PNL includes a first substrate SUB1, a second substrate SUB2 opposed to the first substrate SUB1, and a liquid crystal layer LC held between the first substrate SUB1 and the second substrate SUB2. The first substrate SUB1 and the second substrate SUB2 are bonded to each other with a predetermined cell gap formed between the substrates. The display panel PNL includes a display area DA where an image is displayed. The display area DA includes sub-pixels PX arrayed in a matrix.

The display area DA includes, for example, a red pixel PXR exhibiting red, a green pixel PXG exhibiting green, and a blue pixel PXB exhibiting blue, as the sub-pixels PX. It should be noted that the display area DA may further include a sub-pixel of a color different from red, green and blue (for example, a white pixel exhibiting white). A main pixel for realizing color display is constituted of the sub-pixels PX of different colors as described above. That is, the main pixel is the minimum unit which constitutes a color image. In the example illustrated, the main pixel is constituted of the red pixel PXR, the green pixel PXG, and the blue pixel PXB.

The red pixel PXR includes a red color filter, and is formed to transmit mainly red light of white light from the light source device. The green pixel PXG includes a green color filter, and is formed to transmit mainly green light of the white light from the light source device. The blue pixel PXB includes a blue color filter, and is formed to transmit mainly blue light of the white light from the light source device. Further, the color filters may be formed on the first substrate SUB1 or the second substrate SUB2 though not explained in detail.

The first substrate SUB1 comprises scanning lines G and signal lines S crossing the scanning lines G. Each of the scanning lines G is drawn outside the display area DA, and is connected to a scanning line driver GD. Each of the signal lines S is drawn outside the display area DA, and is connected to a signal line driver SD. The scanning line driver GD and the signal line driver SD are connected to a controller CNT. The controller CNT generates a control signal, based on an image signal, to control the scanning line driver GD and the signal line driver SD.

Each of the sub-pixels PX includes a switching element SW, a pixel electrode PE, a common electrode CE, and the like. The switching element SW is electrically connected to the scanning line G and the signal line S. The switching element SW is composed of, for example, a thin-film transistor. The pixel electrode PE is electrically connected to the switching element SW. The common electrode CE is opposed to each of a plurality of pixel electrodes PE.

Although the details of the configuration of the display panel PNL will not be described here, in a display mode using a longitudinal electric field extending along the normal line of the main surface of the substrate or a display mode using an oblique electric field which is tilted obliquely with respect to the normal line of the main surface of the substrate, the pixel electrode PE is disposed on the first substrate SUB1 while the common electrode CE is disposed on the second substrate SUB2. In addition, both the pixel electrode PE and the common electrode CE are disposed on the first substrate SUB1 in a display mode using a lateral electric field extending along the main surface of the substrate. Furthermore, the display panel PNL may have a structure corresponding to a display mode using an arbitrary combination of the longitudinal, lateral, and oblique electric fields.

Figure 4:
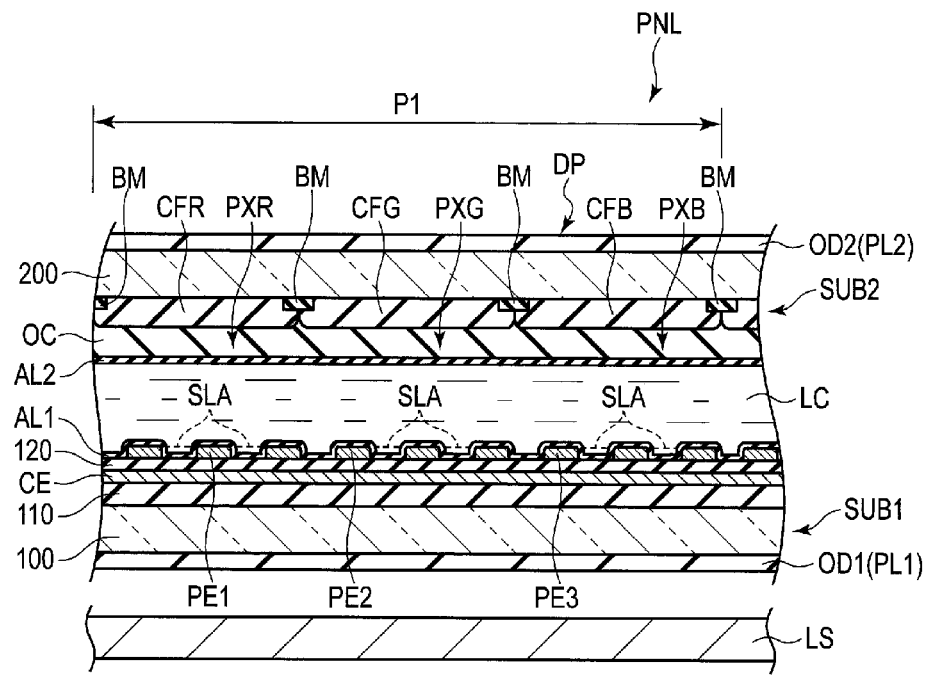
FIG. 4 is a cross-sectional view showing a configuration example of the display panel PNL shown in FIG. 3.

FIG. 4 is a cross-sectional view showing a configuration example of the display panel PNL shown in FIG. 3. A cross-sectional structure of the display panel PNL adopting a fringe field switching (FFS) mode which is one of the display modes using the lateral electric field will be explained briefly.

The first substrate SUB1 includes a first insulating substrate 100, a first insulating film 110, the common electrode CE, a second insulating film 120, pixel electrodes PE1 to PE3, a first alignment film AL1, and the like. The common electrode CE extends over the red pixel PXR, the green pixel PXG, and the blue pixel PXB. Each of the pixel electrode PE1 of the red pixel PXR, the pixel electrode PE2 of the green pixel PXG, and the pixel electrode PE3 of the blue pixel PXB is opposed to the common electrode CE, and includes slits SLA. In the example illustrated, the common electrode CE is located between the first insulating film 110 and the second insulating film 120, and the pixel electrodes PE1 to PE3 are located between the second insulating film 120 and the first alignment film AL1. Alternatively, the pixel electrodes PE1 to PE3 may be located between the first insulating film 110 and the second insulating film 120, and the common electrode CE may be located between the second insulating film 120 and the first alignment film AL1. In this case, the slits SLA are formed in the common electrode CE.

The second substrate SUB2 includes a second insulating substrate 200, a light-shielding layer BM, color filters CFR, CFG and CFB, an overcoat layer OC, a second alignment film AL2, and the like. The color filters CFR, CFG, and CFB are opposed to the pixel electrodes PE1 to PE3, respectively, with the liquid crystal layer LC interposed therebetween. The color filter CFR is a red color filter, the color filter CFG is a green color filter, and the color filter CFB is a blue color filter. Note that, although the color filters CFR, CFG and CFB are formed on the second substrate SUB2 in the example illustrated, they may be formed on the first substrate SUB1.

The liquid crystal layer LC is sealed between the first alignment film AL1 and the second alignment film AL2.

A light source device LS is opposed to the first substrate SUB1. Various types of devices are applicable as the light source device LS, but explanations of the details of its structure will be omitted.

A first optical element OD1 including a first polarizer PL1 is disposed on an outer surface of the first insulating substrate 100. A second optical element OD2 including a second polarizer PL2 is disposed on an outer surface of the second insulating substrate 200. For example, a first absorption axis of the first polarizer PL1 and a second absorption axis of the second polarizer PL2 are orthogonal to each other. In the example illustrated, a surface of the second optical element OD2 corresponds to the display surface DP of the display panel PNL.

The main pixels each composed of the red pixel PXR, the green pixel PXG, and the blue pixel PXB are arrayed at a pitch P1.

Figure 5:
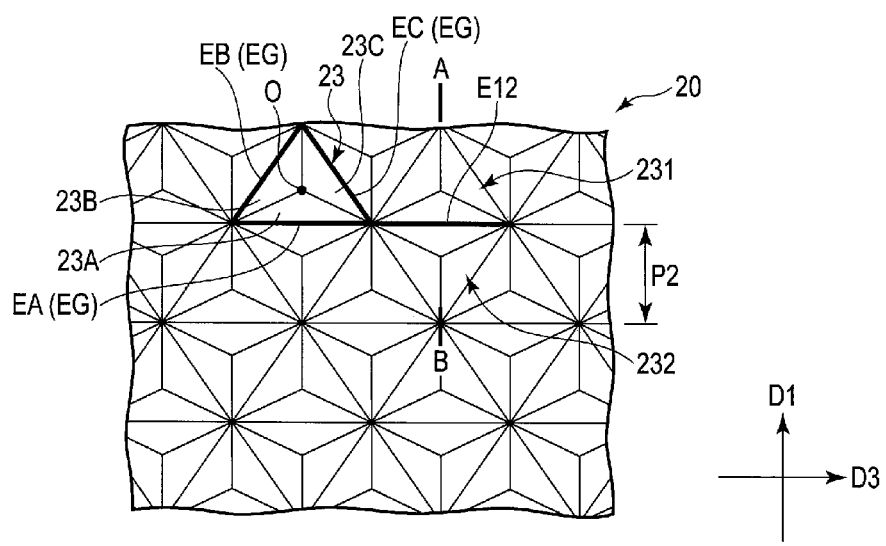
FIG. 5 is a plan view showing a configuration example of an optical element 20 shown in FIG. 1.

FIG. 5 is a plan view showing a configuration example of the optical element 20 shown in FIG. 1. The figure is a plan view of the optical element 20 in a plane defined by the first direction D1 and the third direction D3 which are orthogonal to each other. Although the optical element 20 is to be provided such that it is curved like an letter S as shown in FIG. 1, the figure shows the state in which the optical element 20 is extended in the first direction D1 to be planar.

The optical element 20 is composed of a plurality of retroreflectors 23. In a plan view illustrated, each of the retroreflectors 23 includes an edge EG shaped in a regular triangle. The edge EG includes a side EA parallel to the third direction D3, and sides EB and EC extending in directions intersecting the first direction D1 and the third direction D3. In one example, the retroreflector 23 includes three reflective surfaces 23A, 23B, and 23C which are orthogonal to each other. The sides EA, EB, and EC are included in the reflective surfaces 23A, 23B, and 23C, respectively. A point of intersection of the three reflective surfaces 23A, 23B, and 23C corresponds to the center O of the retroreflector 23. In one example, in the retroreflector 23, the center O is recessed toward the back of the plane of the drawing. When the retroreflector 23 includes a recess portion surrounded by the three reflective surfaces 23A, 23B, and 23C, the edge EG corresponds to a top portion of the retroreflector 23, and the center O corresponds to a bottom portion of the retroreflector 23. Alternatively, the retroreflector 23 may include a protruding portion surrounded by the three reflective surfaces 23A, 23B, and 23C. In this case, the edge EG corresponds to the bottom portion of the retroreflector 23, and the center O corresponds to the top portion of the retroreflector 23.

The retroreflectors 23 are arrayed in the third direction D3. The retroreflectors 23 are also arrayed at a pitch P2 in the first direction D1. However, the retroreflectors 23 adjacent to each other in the first direction D1 and the third direction D3 have shapes inverted relative to each other by 180 degrees. A retroreflector 231 and a retroreflector 232 in the drawing are arranged in the first direction D1. The retroreflector 231 and the retroreflector 232 are axisymmetrical with respect to an edge E12.

The resolution of the aerial image I1 depends on the pitch P2 of the retroreflector 23. In order to suppress deterioration in the resolution, the pitch P2 should desirably be smaller than the pitch P1 of the pixels in the display panel PNL shown in FIG. 4.

Figure 6:
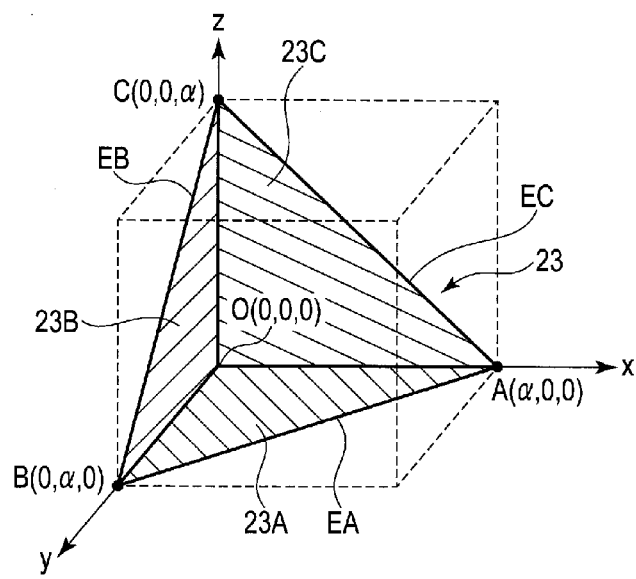
FIG. 6 is a perspective view showing a configuration example of a retroreflector 23 shown in FIG. 5.

FIG. 6 is a perspective view showing a configuration example of the retroreflector 23 shown in FIG. 5. The shape of the retroreflector 23 will be explained by using an xyz-coordinate system in which the x-, y-, and z-axes orthogonal to each other.

The retroreflector 23 includes three reflective surfaces 23A, 23B, and 23C in the xyz-coordinate system. The reflective surfaces 23A to 23C all have the same shape, and are shaped in a right-angled isosceles triangle. Further, the reflective surfaces 23A to 23C are orthogonal to each other. The retroreflector 23 having the reflective surfaces 23A to 23C of such a shape is called a corner cube or a corner reflector.

When it is assumed that point A on the x-axis is ($\alpha$, 0, 0), point B on the y-axis is (0, $\alpha$, 0), and point C on the z-axis is (0, 0, $\alpha$), the reflective surface 23A is formed in the x-y plane and is defined by the origin O, point A, and point B. The reflective surface 23B is formed in the y-z plane and is defined by the origin O, point B, and point C. The reflective surface 23C is formed in the x-z plane and is defined by the origin O, point A, and point C. A line segment which connects points A and B, a line segment which connects points B and C, and a line segment which connects points A and C correspond to the sides EA, EB, and EC of the edge EG shown in FIG. 5, respectively. Note that the origin O corresponds to the center O shown in FIG. 5.

When the origin O corresponds to the bottom portion of the retroreflector 23, a plane defined by the three points A, B, and C does not exist. In other words, the inner part surrounded by the three reflective surfaces 23A to 23C is an air layer. When the origin O corresponds to the top portion of the retroreflector 23, a plane defined by the three points A, B, and C exists. In other words, the retroreflector 23 becomes a regular tetrahedron.

In the retroreflector 23, since the incident light is reflected by each of the three reflective surfaces 23A to 23C, retroreflection in which the light is reflected back in substantially the same optical path as that of the incident light is realized. However, vicinities of three points A, B, and C can be non-retroreflective portions at which the light is not retroreflected, that is, portions where the reflection involving the three reflective surfaces does not occur. The shape of the retroreflector 23 is not limited to that in the example illustrated, but may be a shape in which the non-retroreflective portions are removed.

Figure 7:
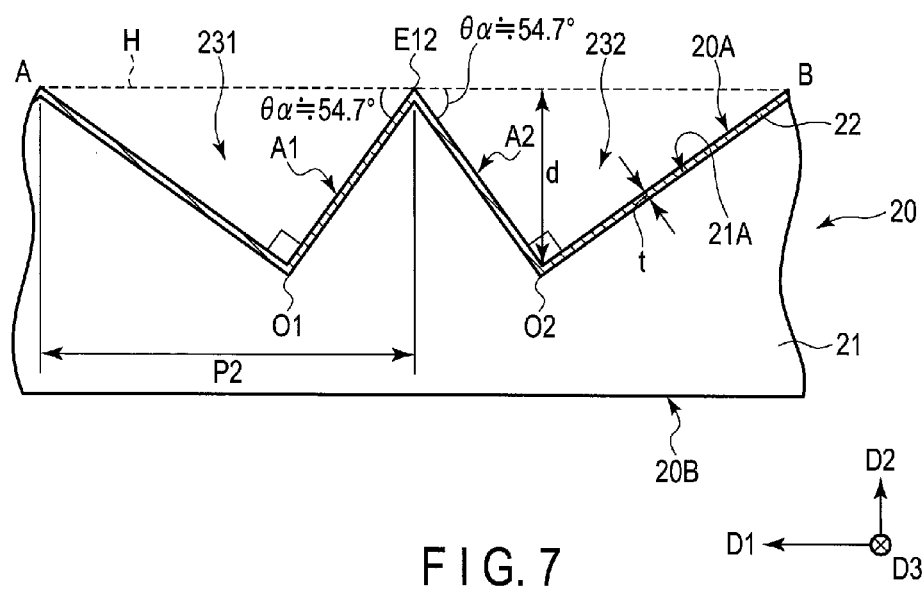
FIG. 7 is a cross-sectional view showing the structure of the optical element 20 taken along line A-B of FIG. 5.

FIG. 7 is a cross-sectional view showing the structure of the optical element 20 taken along line A-B of FIG. 5. The figure illustrates a cross-section of the optical element 20 in which centers O1 and O2 of the retroreflectors 231 and 232 correspond to the bottom portions, respectively. The optical element 20 includes the retroreflective surface 20A which retroreflects the incident light. The retroreflective surface 20A is an uneven surface as illustrated in the drawing. In the display device 1 shown in FIG. 1, the retroreflective surface 20A includes recess portions and protruding portions located on the side facing the retardation film RA and the display module DSP. In the example illustrated, the optical element 20 comprises a base 21 and a metallic thin film 22. The base 21 is formed of, for example, a resin material. A surface 21A of the base 21 is an uneven surface conforming to the retroreflective surface 20A, and a back surface 20B of the optical element 20 (i.e., a back surface of the base 21 in the example illustrated) is a flat surface. The metallic thin film 22 covers the surface 21A of the base 21. The metallic thin film 22 has a substantially uniform thickness. The metallic thin film 22 is formed of, for example, a material having light reflectivity such as silver (Ag), aluminum (Al), or an aluminum alloy. The metallic thin film 22 as described above forms the retroreflective surface 20A. The metallic thin film 22 may be subjected to a surface treatment to prevent corrosion, or may be coated with an inorganic material such as silicon nitride (SiN). Further, if the base 21 is formed of a light reflective material, the metallic thin film 22 may be omitted, and the surface 21A of the base 21 may form the retroreflective surface 20A. The light transmittance of the retroreflective surface 20A is substantially zero, and most of the light incident on the retroreflective surface 20A does not reach the back surface 20B of the optical element 20. In other words, most of the light incident on the optical element 20 is retroreflected by the retroreflective surface 20A without transmitting through the base 21.

A horizontal plane H indicated by a dotted line in the drawing is a plane which intersects an edge E12, and is parallel to the plane defined by the first direction D1 and the third direction D3. The centers O1 and O2 of the retroreflectors 231 and 232 are located to be closer to the back surface 20B than the horizontal plane H. A cross-section defined by the horizontal plane H and the retroreflective surface 20A represents a right-angled triangle, and the horizontal plane H corresponds to the hypotenuse. Angle θα formed between the horizontal plane H and a reflective surface A1 is equal to angle θα formed between the horizontal plane H and a reflective surface A2, and is, for example, approximately 54.7 degrees.

In one example, when the pixel pitch P1 in the display panel PNL is 200 μm, the retroreflector pitch P2 in the optical element 20 is 180 μm, which means that pitch P2 is smaller than pitch P1. Also, the retroreflective surface 20A has a depth d in the second direction D2 corresponding to the normal direction of the horizontal plane H. The depth d is, for example, 73.5 μm. Note that a thickness t of the metallic thin film 22 is 150 nm, which is much smaller than the depth d. For this reason, the surface 21A of the base 21 conforming to the retroreflective surface 20A cannot be buried by the metallic thin film 22 or cannot crush the retroreflective surface 20A when the metallic thin film 22 is formed.

Figure 8:
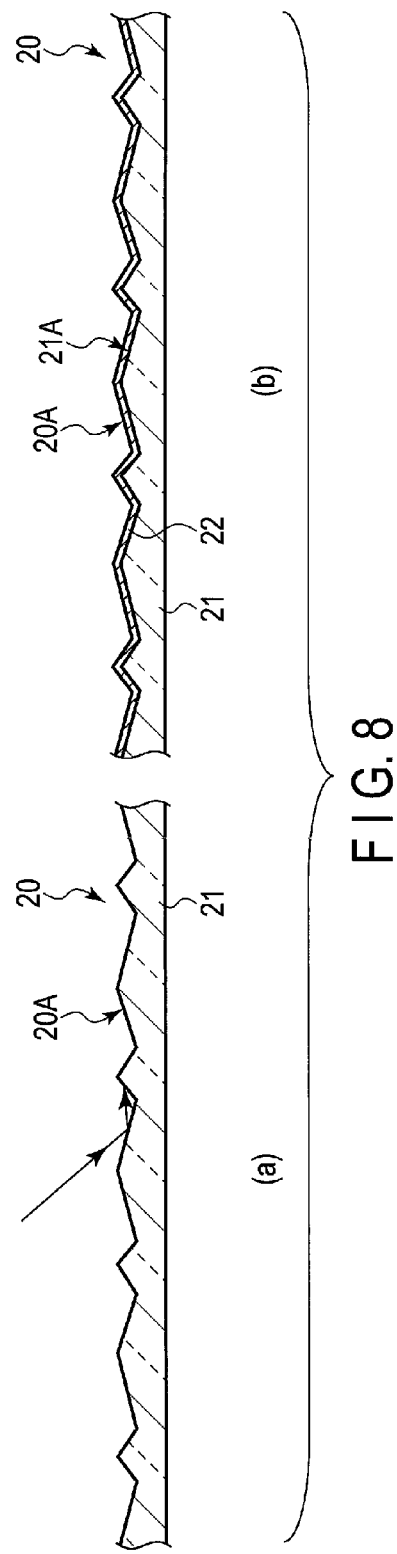
FIG. 8 is a cross-sectional view showing configuration examples of the optical element 20 applicable in the present embodiment.
Figure 9:
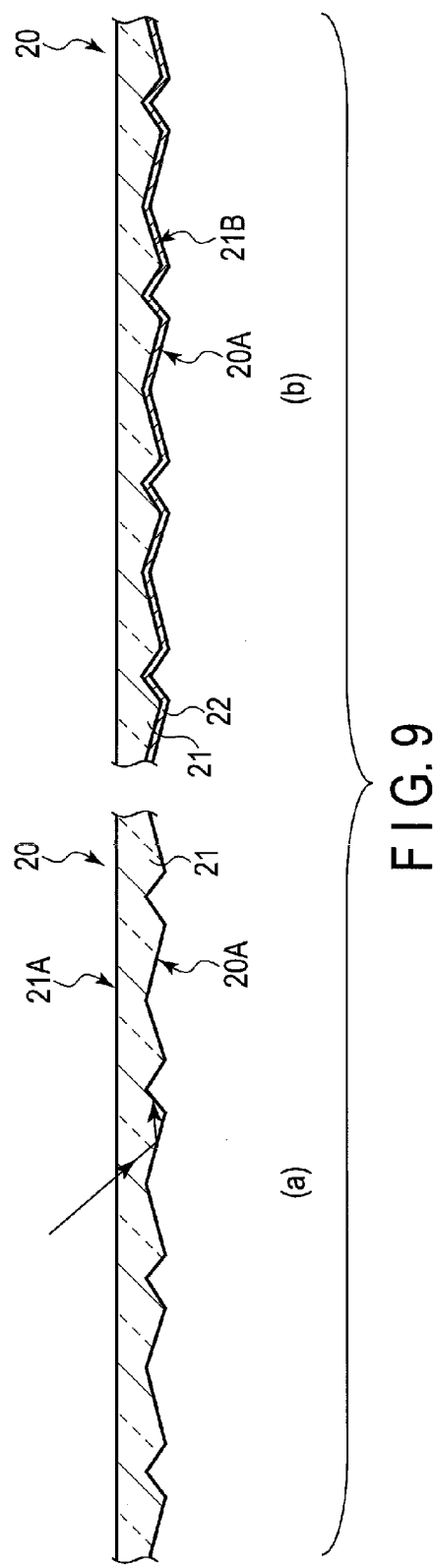
FIG. 9 is a cross-sectional view showing configuration examples of the optical element 20 applicable in the present embodiment.

Each of FIGS. 8 to 10 is a cross-sectional view showing a configuration example of the optical element 20 applicable in the present embodiment.

FIG. 8(a) corresponds to a configuration example in which the surface of the base 21 forms the retroreflective surface 20A. The retroreflective surface 20A corresponds to an interface between the base 21 and the air layer. The light incident on the optical element 20 is reflected by the retroreflective surface 20A without transmitting through the base 21, as shown by an arrow in the drawing. A configuration example shown in FIG. 8(b) is different from the configuration example shown in FIG. 8(a) in that the metallic thin film 22 which covers the surface 21A of the base 21 forms the retroreflective surface 20A.

FIG. 9(a) corresponds to a configuration example in which the back surface of the base 21 forms the retroreflective surface 20A. The surface 21A of the base 21 is a flat surface. The retroreflective surface 20A corresponds to an interface between the base 21 and the air layer. The light incident on the optical element 20 is reflected by the retroreflective surface 20A after transmitting through the base 21, as shown by an arrow in the drawing. A configuration example shown in FIG. 9(b) is different from the configuration example shown in FIG. 9(a) in that the metallic thin film 22 which covers the back surface 21B of the base 21 forms the retroreflective surface 20A.

FIG. 10(a) corresponds to a configuration example in which an interface between the base 21 and a cover member 24 forms the retroreflective surface 20A. The base 21 and the cover member 24 are formed of materials having different refractive indexes, and at least the cover member 24 has optical transmissivity. The light incident on the optical element 20 is reflected by the retroreflective surface 20A after transmitting through the cover member 24, as shown by an arrow in the drawing. A configuration example shown in FIG. 10(b) is different from the configuration example shown in FIG. 10(a) in that the metallic thin film 22 located between the base 21 and the cover member 24 forms the retroreflective surface 20A.

Next, a relative positional relationship between the first portion CC and the second portion CV of the optical element 20, the display module DSP, and the polarizing element 10 applied in the present embodiment will be described.

Figure 11:
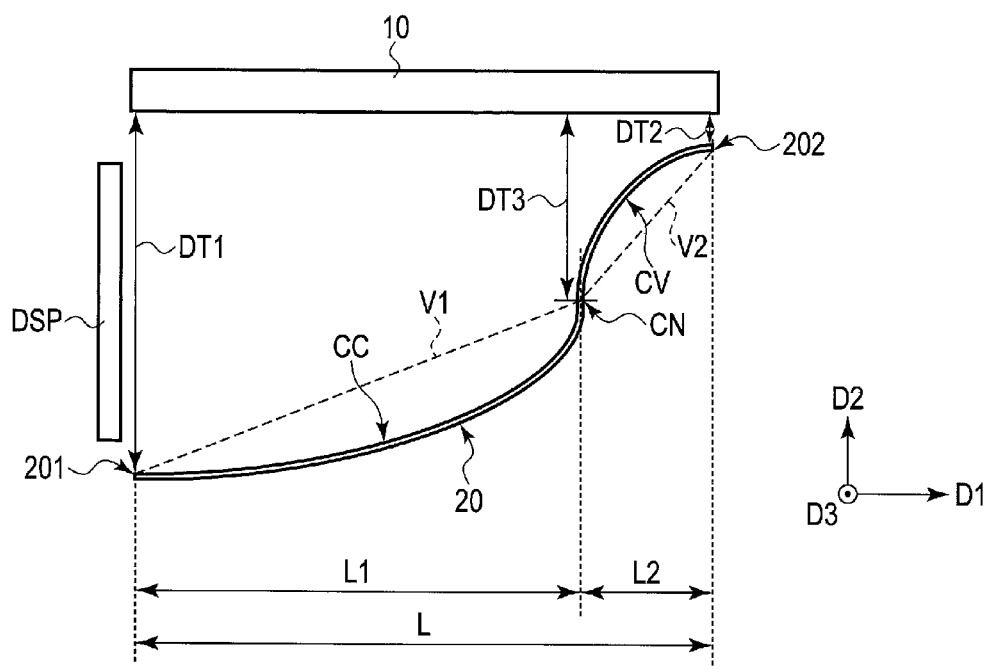
FIG. 11 is a cross-sectional view for explaining the relative positional relationship between the optical element 20, a display module DSP, and a polarizing element 10.

FIG. 11 is a cross-sectional view for explaining the relative positional relationship between the optical element 20, the display module DSP, and the polarizing element 10. Note that in the drawing, illustration of the retardation film and the like is omitted.

The optical element 20 includes a first end portion 201 and a second end portion 202 along the first direction D1. The first end portion 201 is closer to the display module DSP than the second end portion 202 is. A connection part CN of the first portion CC and the second portion CV is located between the first end portion 201 and the second end portion 202 in the optical element 20. In other words, the first portion CC is located between the first end portion 201 and the connection part CN, and the second portion CV is located between the connection part CN and the second end portion 202. When a length from the first end portion 201 to the second end portion 202 in the first direction D1 is defined as L, a length L1 from the first end portion 201 to the connection part CN in the first direction D1 is greater than L/2. Further, a length L2 from the connection part CN to the second end portion 202 in the first direction D1 is less than L/2. Note that in a state in which the optical element 20 is extended in the first direction D1 to be planar, the full length of the optical element 20 in the first direction D1 is greater than the length L.

Also, in the optical element 20, a distance DT1 from the first end portion 201 to the polarizing element 10 in the second direction D2 is greater than a distance DT2 from the second end portion 202 to the polarizing element 10 in the second direction D2. A distance DT3 from the connection part CN to the polarizing element 10 in the second direction D2 is less than the distance DT1, and is greater than the distance DT2. A distance between the first portion CC and the polarizing element 10 in the second direction D2 is gradually reduced from the first end portion 201 toward the connection part CN along the first direction D1. A change in the distance near the first end portion 201 is small, but as the part of the first portion CC is separated from the first end portion 201, the distance is gradually reduced as compared to the distance DT1. Meanwhile, a change in the distance near the connection part CN is large, and as the part of the first portion CC becomes close to the connection part CN, the distance suddenly approximates to the distance DT3. A distance between the second portion CV and the polarizing element 10 in the second direction D2 is gradually reduced from the connection part CN toward the second end portion 202 along the first direction D1. A change in the distance near the connection part CN is large, and as the part of the second portion CV is separated from the connection part CN, the distance suddenly becomes less than the distance DT3. Meanwhile, a change in the distance near the second end portion 202 is small, and as the part of the second portion CV becomes close to the second end portion 202, the distance gradually approximates to the distance DT2.

From one standpoint of the present embodiment, the first portion CC which is concave is intended as a shape recessed toward the side that is more separated from the display module DSP and the polarizing element 10 than a virtual surface V1 connecting the first end portion 201 and the connection part CN. Also, the second portion CV which is convex is intended as a shape projected toward the side that is closer to the display module DSP and the polarizing element 10 than a virtual surface V2 connecting the second end portion 202 and the connection part CN.

FIG. 12 is a perspective view for explaining the relative positional relationship between the optical element 20, the display module DSP, and the polarizing element 10. Note that in the drawing, illustration of the retardation film and the like is omitted, and the display module DSP and the polarizing element 10 are indicated by a dotted line.

In the optical element 20, each of the first end portion 201, the second end portion 202, and the connection part CN extends in the third direction D3. The connection part CN extends in a direction parallel to the side EA of the edge EG of the retroreflector 23 described referring to FIG. 5 (that is, the third direction D3).

Each of the first portion CC and the second portion CV is, for example, a curved surface such as an ellipsoid, a paraboloidal surface, a spherical surface, or an aspherical surface. From another standpoint of the present embodiment, the first portion CC which is concave is intended as a shape (a concave surface) which is recessed toward the side that is more separated from the polarizing element 10 than a virtual surface V3, which passes through the connection part CN and is parallel to the first direction D1 and the third direction D3. Also, the second portion CV which is convex is intended as a shape (a convex surface) projected toward the side that is closer to the polarizing element 10 than the surface V3.

Here, a mechanism of a ghost in the display device to which the optical element 20 in the shape of a flat plate is applied will be described.

Figure 13:
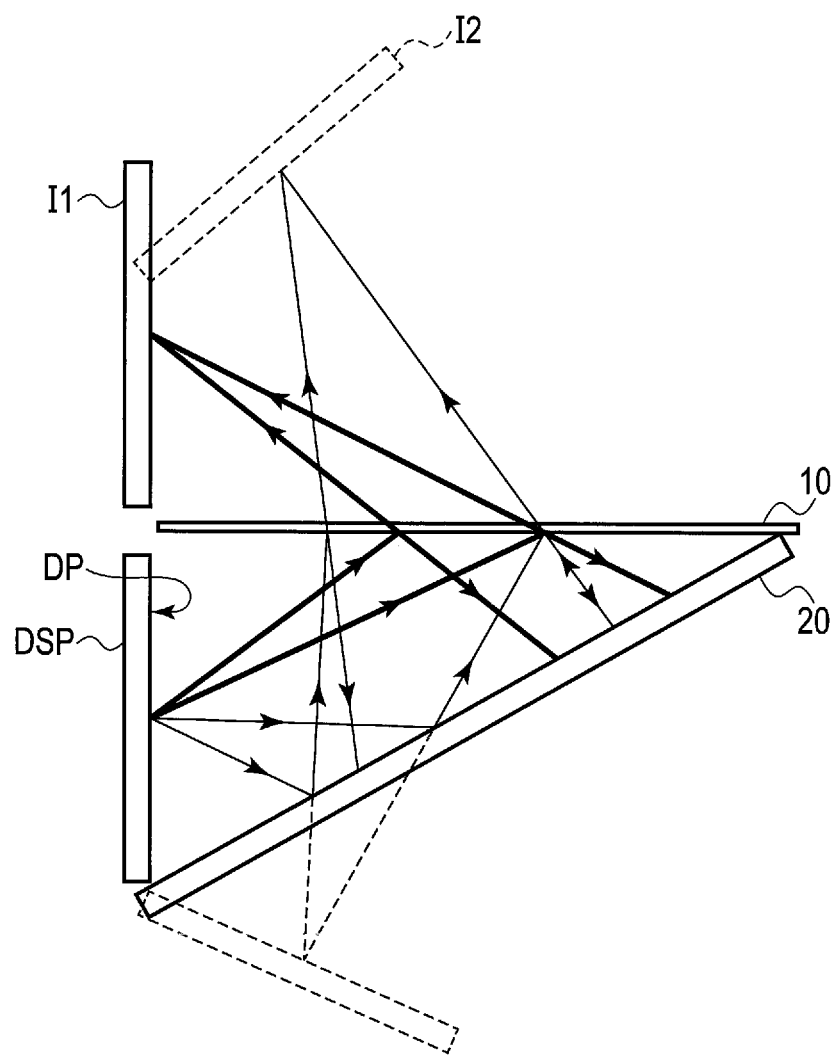
FIG. 13 is an illustration for explaining the mechanism of generation of a secondary image, which is a kind of a ghost.

FIG. 13 is an illustration for explaining the mechanism of generation of a secondary image, which is a kind of a ghost. Here, a case where the plate-like optical element 20 is arranged in a direction intersecting both of the display surface DP of the display module DSP and the main surface of the polarizing element 10 will be described as an example.

First, the aerial image (primary image) I1 which should naturally be displayed will be described briefly. The display light of the display module DSP is incident on the optical element 20 after being reflected by the polarizing element 10, as shown by an arrow in bold line in the drawing. Since the optical element 20 retroreflects the incident light, reflected light which passes through substantially the same optical path as that of the incident light transmits through the polarizing element 10. The aerial image I1 can be observed as the transmitted light of the polarizing element 10 passing through such an optical path forms an image in air.

Next, a secondary image I2 will be described. Part of light of the display light of the display module DSP is incident on the optical element 20 directly, without traveling toward the polarizing element 10, as shown by an arrow in thin line in the drawing. Since part of such incident light forms a relatively large angle of incidence with respect to the normal line of the optical element 20, the light is regularly reflected by a flat surface included in the optical element 20 (for example, the surface 21A of the base 21 shown in FIG. 9, or the surface of the cover member 24 shown in FIG. 10). The light regularly reflected by the optical element 20 is made incident on the optical element 20 again after being reflected by the polarizing element 10. The optical element 20 retroreflects such incident light, and the reflected light which passes through substantially the same optical path as that of the incident light transmits through the polarizing element 10. The secondary image I2 is produced as the transmitted light of the polarizing element 10 passing through such an optical path forms an image in air. Accordingly, when the aerial image I1 is to be observed, not only the aerial image I1 but also the secondary image I2 may be simultaneously observed, depending on the observation position, in which case, degradation in display quality may be caused.

Figure 14:
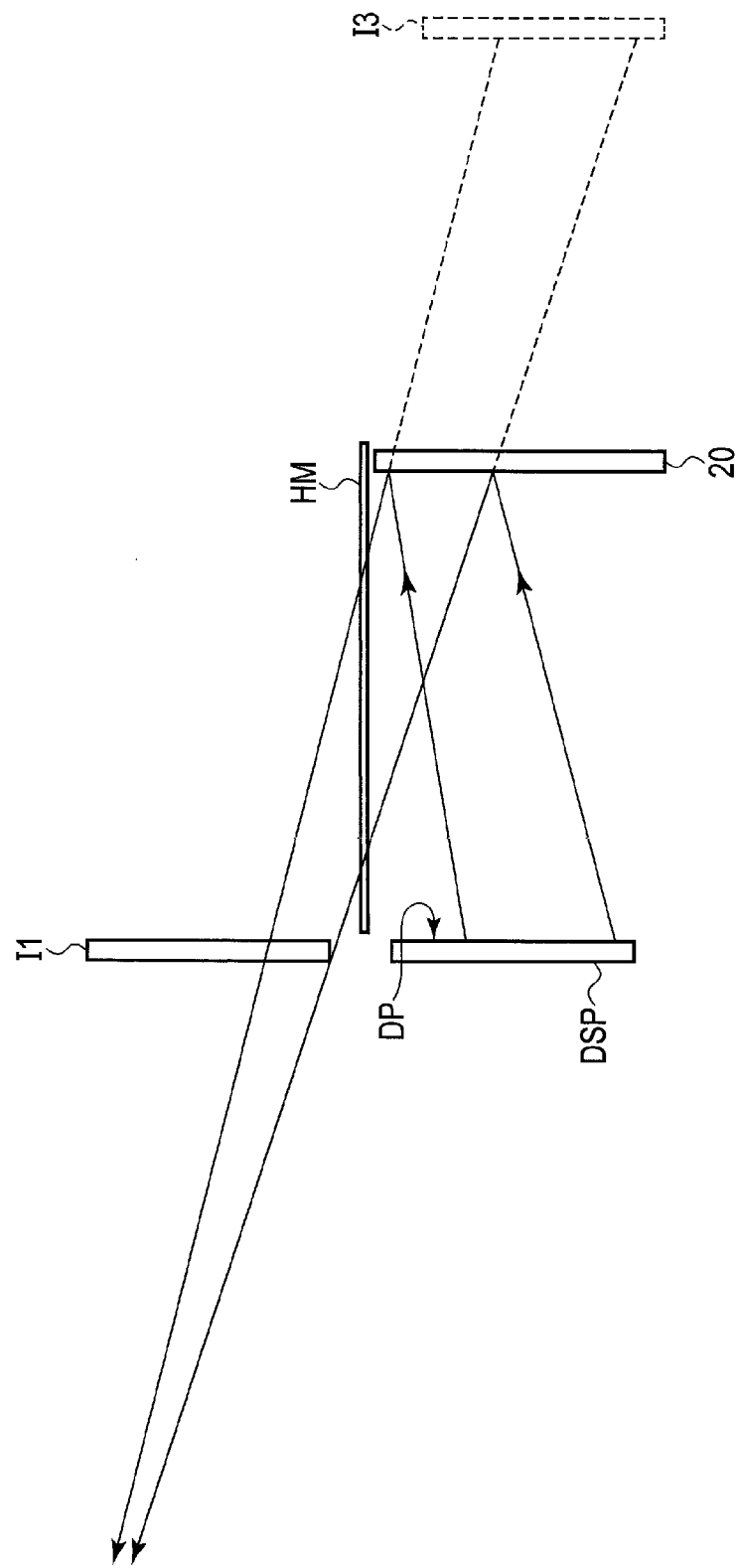
FIG. 14 is an illustration for explaining the mechanism of generation of a mirror image, which is a kind of a ghost.

FIG. 14 is an illustration for explaining the mechanism of generation of a mirror image, which is a kind of a ghost. Here, a case where the plate-like optical element 20 is arranged substantially parallel to the display surface DP of the display module DSP, and a half mirror HM is provided in place of the polarizing element 10 will be described as an example. Explanation of the aerial image I1 is omitted.

Hereinafter, a mirror image I3 will be described. Part of light of the display light of the display module DSP is incident on the optical element 20 directly, without traveling toward the half mirror HM, as shown by an arrow in the drawing. Part of such incident light is regularly reflected by the optical element 20. The light regularly reflected by the optical element 20 transmits through the half mirror HM. Accordingly, when observed by an observer, it appears that light emitted from the display module DSP is emitted from a position I3, which is a position of plane symmetry with respect to the optical element 20. When an image seen in the position I3 overlaps an aerial image from the observer, there is a risk of degrading display quality.

Figure 15:
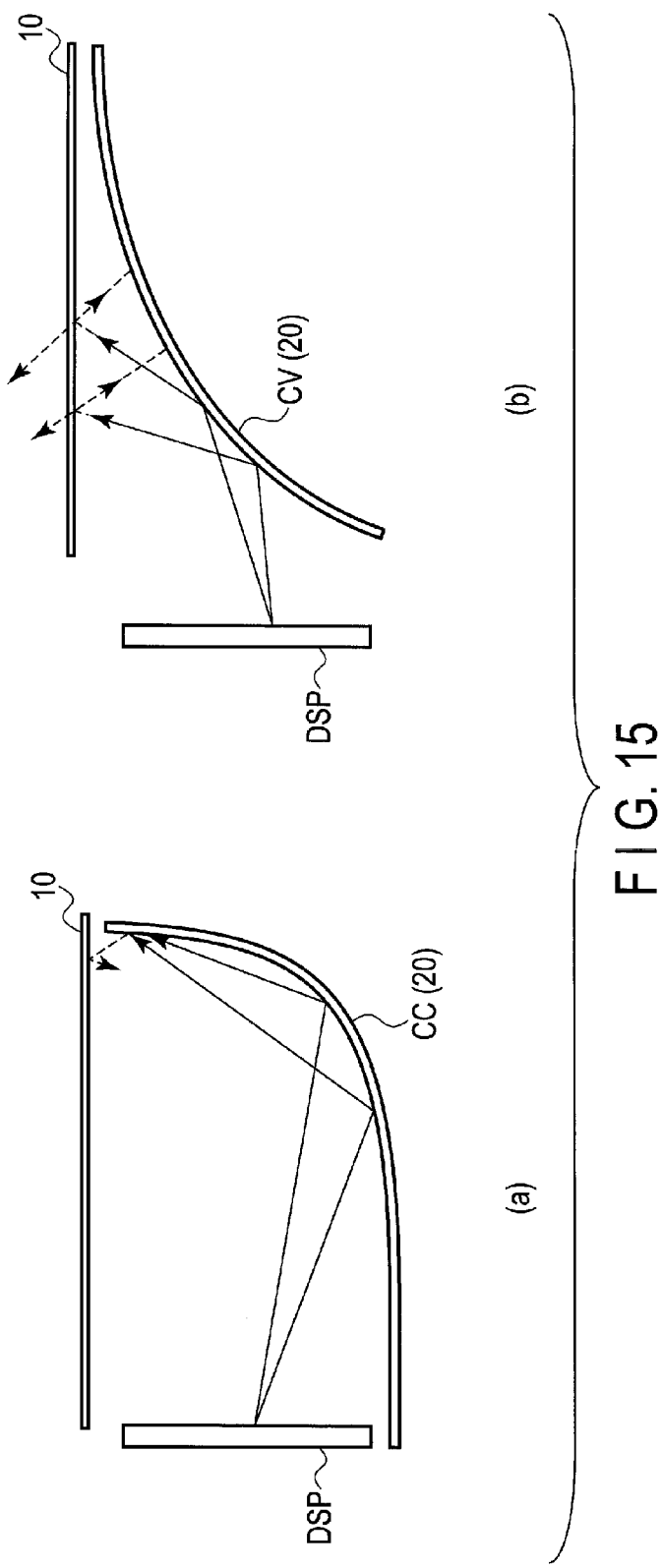
FIG. 15 is an illustration for explaining the mechanism of improving the ghost by the optical element 20 of the present embodiment.

FIG. 15 is an illustration for explaining the mechanism of improving the ghost by the optical element 20 of the present embodiment. Note that in the drawing, illustration of the retardation film and the like is omitted.

FIG. 15(a) illustrates the first portion CC located at the side closer to the display module DSP of the optical element 20. Part of light of the display light of the display module DSP is incident on the first portion CC directly, without traveling toward the polarizing element 10, as shown by an arrow in the drawing. Part of such incident light is regularly reflected at the first portion CC. The light regularly reflected at an area close to the display module DSP of the first portion CC is made incident again on an area separated from the display module DSP. As described above, when the display light is directly incident on the first portion CC, since the first portion CC is formed to be concave, the incident light is regularly reflected multiple times in the first portion CC. The reflectance of the regularly reflected light is less than 10% in the optical element 20. Thus, the reflectance of the reflected light when the light is regularly reflected twice in the optical element 20 becomes less than 1%, and thus, the reflected light barely contributes to display. Further, even if the light of the second reflection reaches the polarizing element 10, the light is reflected by the polarizing element 10, and is trapped within a space surrounded by the display module DSP, the polarizing element 10, and the optical element 20. That is, the reflected light does not transmit through the polarizing element 10. Accordingly, it is possible to suppress occurrence of a ghost produced by the light regularly reflected from the optical element 20, and suppress deterioration in display quality when the aerial image I1 is observed.

FIG. 15(b) illustrates the second portion CV located at the side away from the display module DSP of the optical element 20. Part of light of the display light of the display module DSP is incident on the second portion CV directly, without traveling toward the polarizing element 10, as shown by an arrow in the drawing. The light regularly reflected by the second portion CV is made incident on the second portion CV again after being reflected by the polarizing element 10. When the second portion CV regularly reflects such incident light again, as in the case described referring to FIG. 15(a), that reflected light is of the second reflection in the optical element 20 and the reflectance thereof is extremely low. That is, the reflected light barely contributes to display. Also, the second portion CV may retroreflect light reflected from the polarizing element 10, as shown by a dotted line in the drawing. In that case, although the light which has been retroreflected forms an image by transmitting through the polarizing element 10, because the second portion CV is convex, the image is distorted and visibility of the image can be reduced. Accordingly, it is possible to suppress occurrence of a ghost and deterioration in display quality when the aerial image I1 is observed.

As described above, according to the present embodiment, the optical element 20 can retroreflect the light reflected from the polarizing element 10 of the display light of the display module DSP, and form an image at a position that is in plane symmetry to the display module DSP with respect to the polarizing element 10. Also, since the concave first portion CC located at the side close to the display module DSP and the convex second portion CV located at the side away from the display module DSP are provided in the optical element 20, it is possible to suppress occurrence of a ghost caused by undesired reflection in the optical element 20. Accordingly, it becomes possible to suppress deterioration in display quality of the aerial image I1 observed as the retroreflected light forms an image.

Also, external light traveling toward the optical element 20 via the polarizing element 10 is first converted into the first linearly polarized light, and then is transmitted through the retardation film RA, which is the λ/4 plate, before being reflected by the retroreflective surface 20A and after being reflected by the retroreflective surface 20A. Consequently, the external light is converted into the second linearly polarized light and cannot transmit through the polarizing element 10. In other words, occurrence of a ghost caused by the external light can be suppressed.

Also, the connection part CN of the first portion CC and the second portion CV in the optical element 20 extends in a direction parallel to one side of the edge EG of the retroreflector 23. Accordingly, when a single sheet-like optical element 20 is curved, a generatrix of a curved surface is parallel to one side of the edge EG, and an undesired deformation of the retroreflector 23 located near the connection part ON can be suppressed. Thereby, a reduction of the efficiency of use of light and occurrence of a ghost caused by the undesired reflection can be suppressed.

Further, the polarizing element 10 is of the reflective type which transmits through the first linearly polarized light and reflects the second linearly polarized light, and the retardation film RA is arranged between the display module DSP and the polarizing element 10, and between the polarizing element 10 and the optical element 20. Accordingly, as compared to a case where the polarizing element 10 and the retardation film RA are replaced by the half mirror, the display light emitted from the display module DSP can be reflected efficiently toward the optical element 20. Consequently, the efficiency of use of the display light which contributes to display can be improved. Also, brightness of the display module DSP can be reduced, and the power consumption can be reduced.

The retardation film RA, which is the λ/4 plate, may be bonded to the optical element 20. However, in order to prevent the retardation film RA from being affected by the curved optical element 20, preferably, the retardation film RA should be arranged along the inner surface 10A of the polarizing element 10.

The undesired reflection at the surface of the optical element 20 may become a cause of the ghost as described above. Accordingly, an antireflection film such as a moth-eye sheet or a dielectric multilayer film should preferably be arranged on the surface of the optical element 20.

The polarizing element 10 and the retardation film RA of the present embodiment can be replaced by a beam splitter. The beam splitter has the function of reflecting part of the incident light and also transmitting the other part of the incident light. In one example, the beam splitter may be a half mirror in which the reflectance and the transmittance of the incident light are substantially equal to each other, or a polarizing beam splitter. The reflectance and the transmittance of the beam splitter can be set arbitrarily.

Next, an example of the optical element 20 according to the present embodiment will be described.

Figure 16:
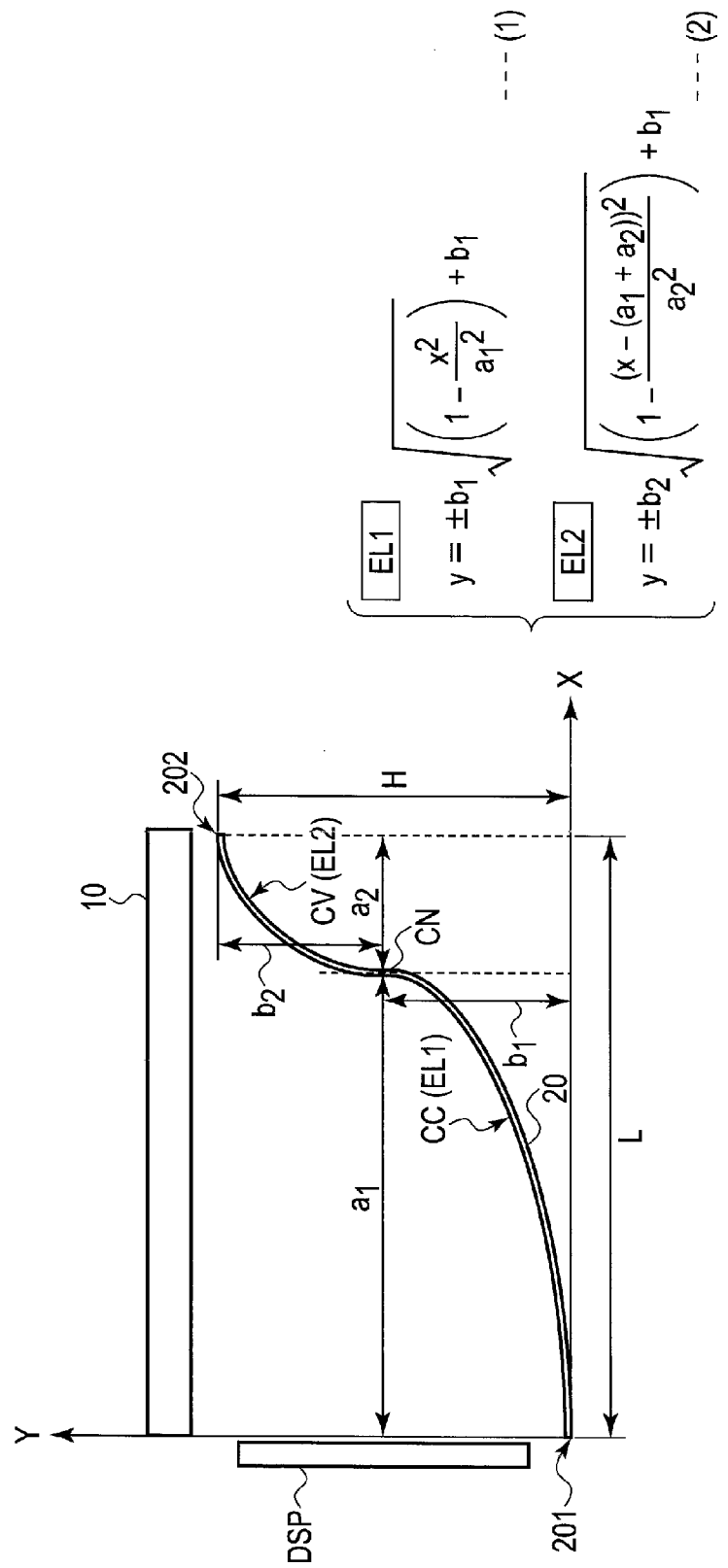
FIG. 16 is an illustration showing an embodiment of the optical element 20.

FIG. 16 is an illustration showing an embodiment of the optical element 20. When the first portion CC and the second portion CV of the optical element 20 are formed as ellipsoids EL1 and EL2, respectively, the shape of the optical element 20 is described by applying an XY-coordinate system in which the X-axis and the Y-axis are orthogonal to each other, and modeling the shape of the optical element 20 with an elliptic curve.

The first end portion 201 of the optical element 20 is assumed as the origin. That is, a position of the first end portion 201 is represented as (X, Y)=(0, 0). A position of the connection part CN is represented as (X, Y)=(a1, b1). A position of the second end portion 202 is represented as (X, Y)=((a1+a2), (b1+b2)). In the first portion CC, the ellipsoid EL1 can be represented by formula (1) in the drawing. In the second portion CV, the ellipsoid EL2 can be represented by formula (2) in the drawing.

In one example, the length L of the optical element 20 along the X-axis corresponding to (a1+a2) is 200 mm, in which a length corresponding to a1 is 150 mm, and a length corresponding to a2 is 50 mm.

A height H of the optical element 20 along the Y-axis corresponding to (b1+b2) is 100 mm, in which a height corresponding to b1 is 60 mm, and a height corresponding to b2 is 40 mm.

Next, another configuration example of the present embodiment will be described. Note that the same reference numbers will be added to the same structures as those of the configuration examples described above, and detailed descriptions of them will be omitted.

Figure 17:
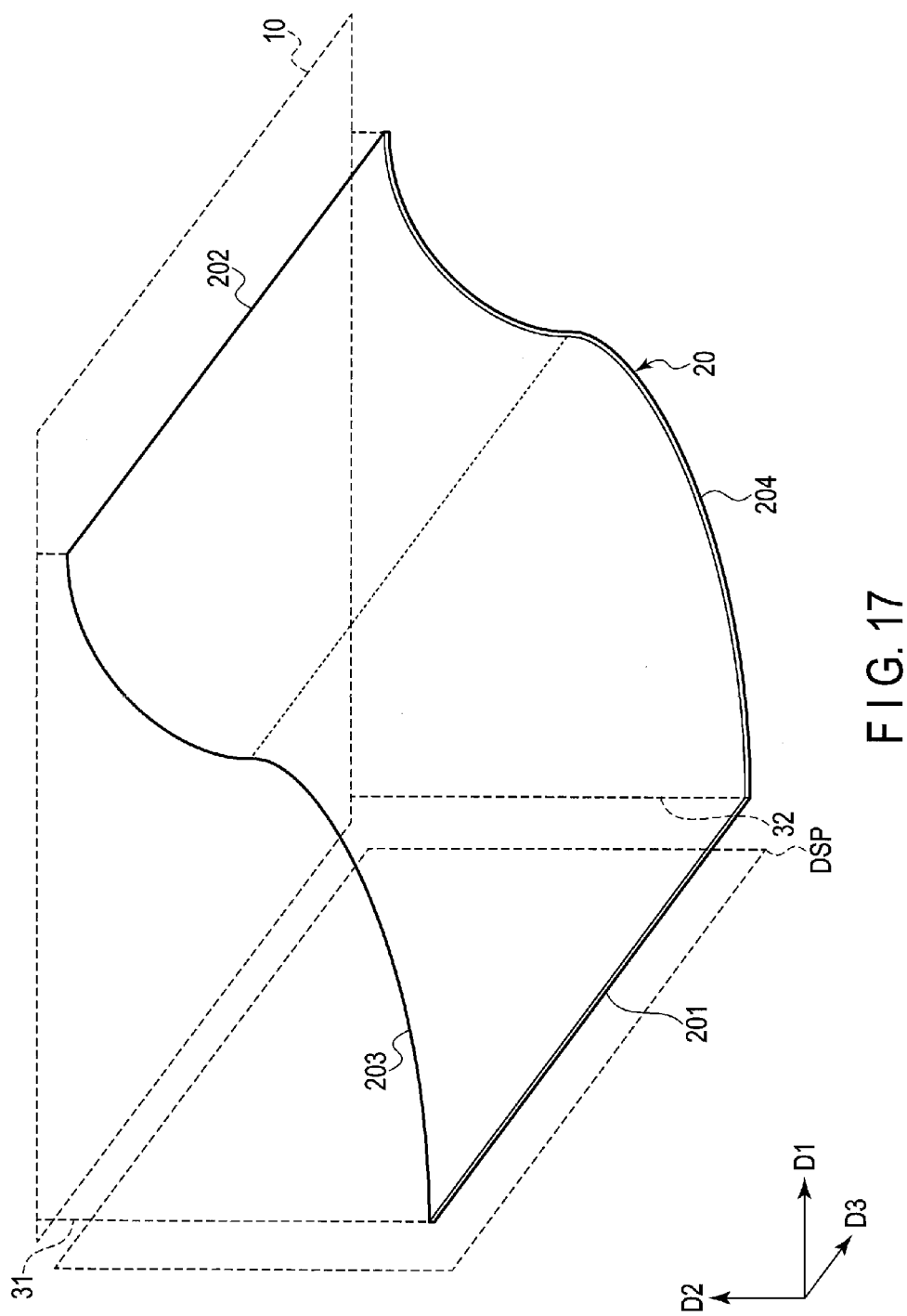
FIG. 17 is a perspective view showing another configuration example of the display device 1 of the present embodiment.

FIG. 17 is a perspective view showing another configuration example of the display device 1 of the present embodiment. The configuration example illustrated is different from the above-described configuration example in that the place where an optical element is provided is not only the front side of the display module DSP. That is, optical elements 31 and 32 including retroreflectors are also provided at the sides of the display module DSP. That is, as described in the above configuration example, the optical element 20 is arranged at a position facing the display module DSP. The optical element 31 is arranged along an S-shaped third end portion 203 connecting the first end portion 201 and the second end portion 202 of the optical element 20. The optical element 32 is arranged along an S-shaped fourth end portion 204 connecting the first end portion 201 and the second end portion 202 of the optical element 20.

According to this configuration example, of the display light emitted from the display module DSP, even if the light reflected by the polarizing element 10 travels laterally away from the optical element 20, such light is retroreflected by the optical elements 31 and 32. Therefore, the retroreflected light contributes to display after transmitting through the polarizing element 10. Accordingly, the efficiency of use of the display light which contributes to display can be improved, and the brightness of the aerial image I1 can be enhanced.

As explained above, a display device capable of suppressing deterioration in display quality can be provided by the present embodiment.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. Some of the constituent elements disclosed in the embodiments may be deleted, and the constituent elements described in different embodiments may be arbitrarily combined.

What is claimed is:

1. A display device comprising:
a display module which emits display light;
a polarizing element including a transmission axis which transmits first linearly polarized light, the polarizing element reflecting second linearly polarized light intersecting the transmission axis; and
an optical element comprising a retroreflector which retroreflects light reflected from the polarizing element, the optical element being curved, and comprising a first portion which is concave, and a second portion which is convex and is connected to the first portion.

2. The display device of claim 1, wherein the first portion is closer to the display module than the second portion is.

3. The display device of claim 2, wherein:
the optical element includes a first end portion and a second end portion;
the first end portion is closer to the display module than the second end portion is; and
when a length from the first end portion to the second end portion in a first direction is defined as L, a length from the first end portion to a connection part of the first portion and the second portion in the first direction is greater than L/2.

4. The display device of claim 3, wherein:
a first distance from the first end portion to the polarizing element in a second direction is greater than a second distance from the second end portion to the polarizing element in the second direction; and
a third distance from the connection part to the polarizing element in the second direction is less than the first distance, and is greater than the second distance.

5. The display device of claim 1, wherein:
the retroreflector comprises a triangular edge in planar view; and
a connection part of the first portion and the second portion extends in a direction parallel to one side of the edge.

6. The display device of claim 1, wherein each of the first portion and the second portion is a curved surface.

7. The display device of claim 1, further comprising a retardation film which imparts a phase difference to transmitted light, wherein
the retardation film is disposed along an inner surface of the polarizing element.

8. A display device comprising:
a display module which emits display light;
a polarizing element including a transmission axis which transmits first linearly polarized light, the polarizing element reflecting second linearly polarized light intersecting the transmission axis; and
an optical element comprising a retroreflector which retroreflects light reflected from the polarizing element, the optical element comprising a first portion and a second portion,
the first portion being a concave surface recessed toward a side separated from the polarizing element,
the second portion being a convex surface projected toward a side closer to the polarizing element,
the first portion being closer to the display module than the second portion is.

9. The display device of claim 8, wherein:
the optical element includes a first end portion and a second end portion;
the first end portion is closer to the display module than the second end portion is; and
when a length from the first end portion to the second end portion in a first direction is defined as L, a length from the first end portion to a connection part of the first portion and the second portion in the first direction is greater than L/2.

10. The display device of claim 9, wherein:
a first distance from the first end portion to the polarizing element in a second direction is greater than a second distance from the second end portion to the polarizing element in the second direction; and a third distance from the connection part to the polarizing element in the second direction is less than the first distance, and is greater than the second distance.

11. The display device of claim 8, wherein:

the retroreflector comprises a triangular edge in planar view; and a connection part of the first portion and the second portion extends in a direction parallel to one side of the edge.

12. The display device of claim 8, further comprising a retardation film which imparts a phase difference to transmitted light, wherein the retardation film is disposed along an inner surface of the polarizing element.

13. A display device comprising:

a display module which emits display light;

a polarizing element including a transmission axis which transmits first linearly polarized light, the polarizing element reflecting second linearly polarized light intersecting the transmission axis; and an optical element comprising a retroreflector which retroreflects light reflected from the polarizing element, the optical element including a first end portion, a second end portion, a first portion, a second portion, and a connection part connecting the first portion and the second portion, the first portion being located between the first end portion and the connection part, and having a concave shape recessed toward a side that is more separated from the display module and the polarizing element than a surface connecting the first end portion and the connection part, the second portion being located between the connection part and the second end portion, and having a convex shape projected toward a side that is closer to the display module and the polarizing element than a surface connecting the connection part and the second end portion.

14. The display device of claim 13, wherein the first portion is closer to the display module than the second portion is.

15. The display device of claim 13, wherein when a length from the first end portion to the second end portion in a first direction is defined as L, a length from the first end portion to the connection part in the first direction is greater than L/2.

16. The display device of claim 13, wherein:

a first distance from the first end portion to the polarizing element in a second direction is greater than a second distance from the second end portion to the polarizing element in the second direction; and a third distance from the connection part to the polarizing element in the second direction is less than the first distance, and is greater than the second distance.

17. The display device of claim 13, wherein:

the retroreflector comprises a triangular edge in planar view; and the connection part extends in a direction parallel to one side of the edge.

18. The display device of claim 13, wherein each of the first portion and the second portion is a curved surface.

19. The display device of claim 13, further comprising a retardation film which imparts a phase difference to transmitted light, wherein the retardation film is disposed along an inner surface of the polarizing element.

* * * * *